G. H. MATTESON.
CUSHION TIRE.
APPLICATION FILED JAN. 24, 1910.
995,620.
Patented June 20, 1911.
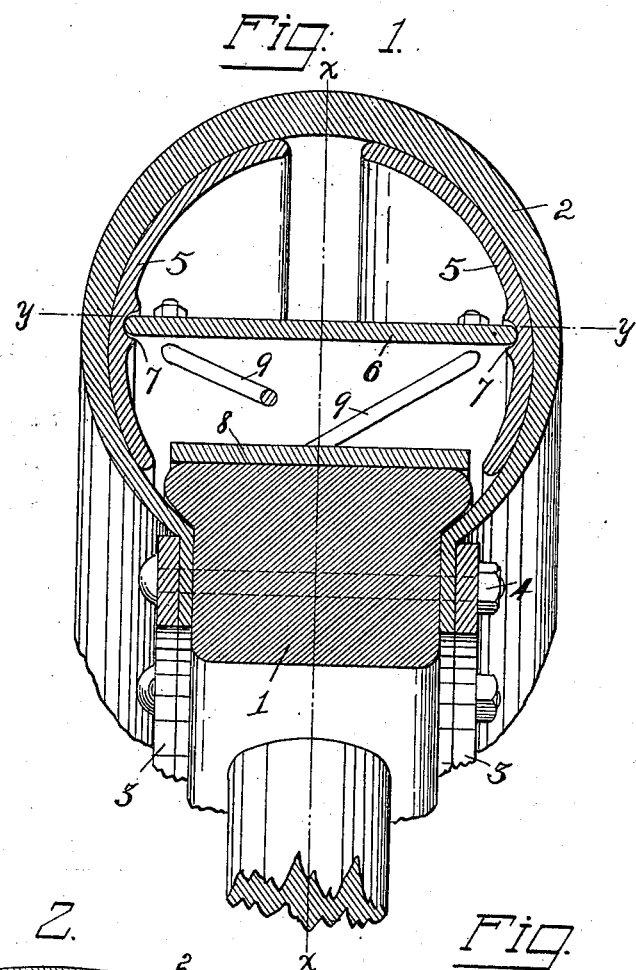
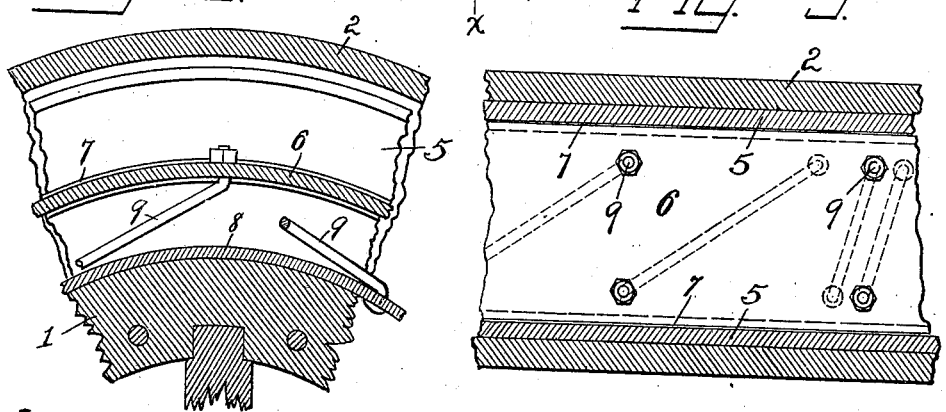
WITNESSES:
C. H. Bills.
E. E. Thomas.
INVENTOR.
George H. Matteson,
By Owen & Owen,
His attys.

UNITED STATES PATENT OFFICE.

GEORGE H. MATTESON, OF TOLEDO, OHIO, ASSIGNOR OF ONE-HALF TO JOHN M. HAYES, OF TOLEDO, OHIO.

CUSHION-TIRE.

995,620.            Specification of Letters Patent.    Patented June 20, 1911.

Application filed January 24, 1910. Serial No. 539,835.

*To all whom it may concern:*

Be it known that I, GEORGE H. MATTESON, a citizen of the United States, and a resident of Toledo, in the county of Lucas and State of Ohio, have invented a certain new and useful Cushion-Tire; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle tires of the cushion type, and is adapted for use in connection with bicycles, carriages, automobiles, and other kinds of vehicles.

The object of my invention is the provision of a tire of this class, which is simple, efficient and economical in its construction, and while having all the advantages of a pneumatic tire avoids the objectionable features thereof, principal among them being the collapsing of a tire on being punctured and the bursting of the same due to the expansion of the air therein when the tire becomes heated by fast or hard running.

The invention is fully described in the following specification, and a preferred embodiment of the same illustrated in the accompanying drawings, in which,—

Figure 1 is a cross-section of a rim and tire embodying my invention. Fig. 2 is a section of a portion of the same on the line $x$ $x$ in Fig. 1, and Fig. 3 is a section of a portion of the same on the line $y$ $y$ in Fig. 1.

Referring to the drawings, 1 designates the rim of a wheel, and 2 the casing of the tire, which casing has its edges securely clamped to the opposite sides of the rim by the coöperating action of the rings 3, 3 and bolts 4, or may be secured to the rim in any other suitable manner.

Mounted within the hollow or interior of the casing are the two annular plates or rings 5, 5 which bear outwardly against opposite sides of the casing and are curved in cross-section to conform to the intended contour of the casing sides, as indicated in Fig. 1. These plates or rings are formed of a slightly resilient material to adapt them to give to a certain extent under pressure, and extend in opposite directions from the center of tread of the tire to adjacent the sides of the rim 1, thus providing a space between their outer edges and also between their inner edges and the respective sides of the rim, as indicated. The plates or rings 5, 5 are spaced apart and held in contact with the casing sides by a ring or band 6, which extends entirely around the interior of the tire in or adjacent the center thereof. This ring does not have a rigid bearing against the plates 5, 5 but on the contrary serves as a double fulcrum on which the plates 5 laterally rock. For this purpose the edges of the ring 6 are shown as being rounded and seated within annular concaved recesses 7 in the plate sides. With this construction of inner bracing means for the tire it is apparent that the outer edges of the plates 5, 5 being of a resilient nature, will yield under pressure exerted on the tread of the tire, and as the outer edges of such plates at the point of pressure are pressed inwardly toward the fulcrum ring 6 the plates at such point will oscillate on the edges of the ring 6 and their inner edges will move outwardly to effect an expansion of the casing adjacent the rim to compensate for the radial collapsing of the casing. It is thus evident that the plates 5, 5 have a lever action at the point of pressure and serve to prevent any slack occurring in the casing under running conditions.

To prevent a longitudinal creeping of the ring 6 and also movements in other directions it is anchored by a series of truss-rods 9 to a band 8 shrunk on the rim. These rods extend from adjacent the opposite edges of the ring 6 diagonally thereof and are attached at their opposite ends to the band 8, as shown. This arrangement may be changed, however, as desired, the construction shown being only illustrative of the idea.

It is thus apparent that I have provided a tire of the cushion type, which may be as large as a pneumatic tire and in which the combined action of the cushion plates 5, 5 and fulcrum ring 6 gives approximately the same results as a pneumatic tire, and is not liable to puncture or to burst by the expansion of air under undue internal heat.

I wish it understood that my invention is not limited to any specific construction or arrangement of the parts except in so far as such limitations are specified in the claims.

Having thus described my invention, what I claim as new and desire to secure by Letters Patent, is,—

1. In a cushion tire, the combination of a wheel rim, a casing mounted thereon, annular rings disposed within the casing and conforming in cross section to the desired contour of the casing sides, and means rigidly spacing said rings apart intermediate their edges and holding them in contact with the opposed casing walls, said means having pivotal bearings on said rings to permit portions of the rings to which radial pressure is applied to laterally oscillate thereon.

2. In a cushion tire, the combination of a wheel rim, a casing mounted thereon, annular plates being curved in cross-section and bearing outwardly against opposite walls of the casing, an annular member pivotally bearing at its edges against such plates intermediate their edges to retain the same in contact with the respective sides of the casing.

3. In a cushion tire, the combination of a wheel rim, a casing attached thereto, annular plates disposed within said casing, said plates being curved in cross section and bearing outwardly against the opposite sides of the casing, an annular member bearing against such plates intermediate their edges to retain the same in contact with the casing walls, and means for preventing a creeping of such member relative to the rim.

In testimony whereof, I have hereunto signed my name to this specification in the presence of two subscribing witnesses.

GEORGE H. MATTESON.

Witnesses:
C. W. OWEN,
E. E. THOMAS.

---

Copies of this patent may be obtained for five cents each, by addressing the "Commissioner of Patents, Washington, D. C."